US010173372B2

(12) United States Patent
Tateno

(10) Patent No.: US 10,173,372 B2
(45) Date of Patent: Jan. 8, 2019

(54) METHOD FOR FORMING HEAT-SHIELDING FILM AND HEAT-SHIELDING FILM STRUCTURE

(71) Applicant: TOYOTA JIDOSHA KABUSHIKI KAISHA, Toyota-shi, Aichi-ken (JP)

(72) Inventor: Manabu Tateno, Suntou-gun (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 230 days.

(21) Appl. No.: 15/093,811

(22) Filed: Apr. 8, 2016

(65) Prior Publication Data
US 2016/0305037 A1  Oct. 20, 2016

(30) Foreign Application Priority Data

Apr. 17, 2015  (JP) .................. 2015-085365

(51) Int. Cl.
  *B29C 65/00*  (2006.01)
  *B29C 65/54*  (2006.01)
  (Continued)

(52) U.S. Cl.
  CPC ............ *B29C 65/54* (2013.01); *B32B 15/016* (2013.01); *C22C 21/00* (2013.01); *C25D 11/04* (2013.01);
  (Continued)

(58) Field of Classification Search
  CPC ....... F02F 3/10; F02F 3/12; F02F 3/14; C25D 11/04; B29C 65/54; B29C 65/542;
  (Continued)

(56) References Cited

U.S. PATENT DOCUMENTS 5,253,625 A * 10/1993 Donahue ................. C22C 21/02
                                                    123/193.4
2007/0051465 A1 * 3/2007 Naughton ............... B29C 65/54
                                                    156/305
2014/0245994 A1   9/2014 Nishikawa et al.

FOREIGN PATENT DOCUMENTS

JP   S47-044418 B   11/1972
JP   10158592 A * 6/1998 ........... B29C 66/534
  (Continued)

OTHER PUBLICATIONS

Machine translation of JP 10-158592 date unknown.*
U.S. Appl. No. 16/024,174, filed Jun. 29, 2018.

*Primary Examiner* — John L Goff, II
(74) *Attorney, Agent, or Firm* — Finnegan, Henderson, Farabow, Garrett & Dunner, LLP

(57) ABSTRACT

A second heat-shielding film 20 produced by anodizing treatment of both surfaces of pure Al foil with an Al purity equal to or larger than 99.0% is disposed on a surface of a first heat-shielding film 12 that is formed by anodizing treatment of a surface of a combustion chamber configuring component 10 formed from an Al alloy (Al purity of less than 99.0%) as a based material. A heat resistant adhesive is poured from between these heat-shielding films, and the heat resistant adhesive is heated and cured (an intermediate layer 22). Since the second heat-shielding film has low surface roughness Ra of an average of approximately 1.0 µm even in an unpolished state, polishing or the like for the film with an objective of smoothing after bonding of the second heat-shielding film can be omitted. Further, the heat-shielding film structure with a smoothed surface can be provided.

7 Claims, 4 Drawing Sheets

(51) Int. Cl.
  *C25D 11/04* (2006.01)
  *C22C 21/00* (2006.01)
  *B32B 15/01* (2006.01)
  *C25D 11/24* (2006.01)
  *F02F 3/10* (2006.01)

(52) U.S. Cl.
  CPC ............ *C25D 11/24* (2013.01); *C25D 11/246* (2013.01); *F02F 3/10* (2013.01)

(58) Field of Classification Search
  CPC ... B29C 65/544; B29C 65/546; B29C 65/548; B29C 66/02245; B32B 38/0012; B32B 38/0016; B32B 38/10
  USPC ......................................................... 156/305
  See application file for complete search history.

(56) References Cited

FOREIGN PATENT DOCUMENTS

| | | |
|---|---|---|
| JP | 2012-72745 | 4/2012 |
| JP | 2012-122445 | 6/2012 |
| JP | 2013-14830 | 1/2013 |
| JP | 2013-24142 | 2/2013 |
| JP | 2013-60620 | 4/2013 |
| JP | 2014-152735 | 8/2014 |
| JP | 2015-31226 | 2/2015 |
| JP | 2016-37660 | 3/2016 |

\* cited by examiner

S1: FORM FIRST HEAT-SHIELDING FILM ON SURFACE OF COMBUSTION CHAMBER CONFIGURING COMPONENT
S2: GRIND SURFACE OF FIRST HEAT-SHIELDING FILM
S3: MAKE SECOND HEAT-SHIELDING FILM
S4: BOND FIRST HEAT-SHIELDING FILM AND SECOND HEAT-SHIELDING FILM

METHOD FOR FORMING HEAT-SHIELDING FILM AND HEAT-SHIELDING FILM STRUCTURE

BACKGROUND

Technical Field

Field of the Invention

Embodiments of the present invention relates to a method for forming a heat-shielding film and a heat-shielding film structure.

Background Art

Conventionally, JP2012-072745A, for example, discloses a method for forming a heat-shielding film, which includes a step of forming a porous layer by anodizing the top surface of a piston formed from an Al alloy as a base material, a step of forming a coating layer on the surface of the porous layer by plasma-spraying $Y_2O_3$-stabilized $ZrO_2$ powder, and a step of finishing the surface of the coating layer so that the surface of the coating layer is smoothed. The porous layer is a so-called anodized aluminum film. The anodized aluminum film has an infinite number of pores that are formed in the process of anodizing, and by such a porous structure, the anodized aluminum film functions as a heat-shielding film having a lower heat conductivity and a lower heat capacity per unit volume than the base material of the piston. Further, the coating layer is formed to close the opening portions of the pores of the porous layer, and functions as the heat-shielding film having a lower heat conductivity than the piston base material.

Further, JP2014-152735A discloses the method for forming a heat-shielding film, which includes the step of forming a resin layer containing a silicon resin and hollow particles on the top surface of a piston formed from an Al alloy as a base material, and the step of bonding metal foil that is separately produced onto the surface of the silicon resin layer, though attention is not paid to the heat-shielding property of the anodized aluminum film. Specifically, in this forming method, the silicon resin layer is formed first on the top surface of the piston by repeating coating of a silicon resin material and preliminary drying. Next, metal foil that is produced into the shape corresponding to the top surface by press forming of a metal such as Ni is disposed on the silicon resin layer, and by thermally treating them integrally, the silicon resin layer is cured to be bonded to the metal foil.

LIST OF RELATED ART

Following is a list of patent literatures which the applicant has noticed as related arts of the present invention.
[Patent Literature 1]
 JP2012-072745A
[Patent Literature 2]
 JP2012-122445A
[Patent Literature 3]
 JP2014-152735A
[Patent Literature 4]
 JP2013-014830A

SUMMARY

Incidentally, an ordinary base material for a piston contains additives for enhancing mechanical properties. However, there is the problem that the additives (mainly Si) inhibit an anode oxidation reaction of an Al alloy from proceeding, and causes microscopic asperities on the surface of the anodized aluminum film which is formed. The problem similarly arises in the porous layer in JP2012-072745A, but since the coating layer is formed on the porous layer and finishing is applied to the coating layer, the asperities on the porous layer can be absorbed by the smoothed coating layer. Accordingly, occurrence of troubles accompanying formation of the heat-shielding film such as reduction in the heat-shielding property by increase in the heat transfer area, and reduction in flowability of a generated flame due to increase in surface roughness can be also restrained favorably.

However, surface roughness Ra (which refers to arithmetic mean roughness that is measured in conformity with JIS B601 (2001). The same will apply hereinafter) is much larger than the surface roughness Ra of the piston base material (an average of 1.0 μm or les Consequently, in order to obtain desired surface roughness by the finishing described above, a large amount of the coating layer has to be cut in the thickness direction, and as a result, the heat-shielding performance of the coating layer portion is likely to be reduced. Further, by cutting a large amount of the portion having a large number of asperities, the strength of the coating layer itself is reduced, and there arises the possibility of the coating layer needing to be reformed. Further, the labor time for the coating layer increases, and thereby there arises the problem of increasing cost.

The present invention is made in the light of the aforementioned problems. That is, an object of the present invention is to restrain film performance and film strength from being impaired in a formation process of a heat-shielding film, and provide a heat-shielding structure having a smoothed surface.

A first aspect of an embodiment of the present application is a method for forming a heat-shielding film, comprising:
 a step of forming, on a surface of a component that is formed from an Al alloy with an Al purity of less than 99.0% as a base material and configures a combustion chamber of an internal combustion engine, a first heat-shielding film that has a lower heat conductivity and a lower heat capacity per unit volume than the base material, and has a porous structure;
 a step of producing a second heat-shielding film in which a porous alumina having a lower heat conductivity and a lower heat capacity per unit volume than the base material is formed on a surface, by anodizing treatment of Al foil with an Al purity equal to or higher than 99.0%; and
 a step of bonding the second heat-shielding film onto a surface of the first heat-shielding film.

A second aspect of an embodiment of the present application is the method for forming a heat-shielding film according to the first aspect discussed above,
 wherein the step of bonding the second heat-shielding film is a step of disposing the second heat-shielding film on the surface of the first heat-shielding film in a state where surface roughness of the first heat-shielding film is higher than surface roughness of the second heat-shielding film which is opposed to the first heat-shielding film, and pouring an adhesive to between the first heat-shielding film and the second heat-shielding film and curing the adhesive.

A third aspect of an embodiment of the present application is the method for forming a heat-shielding film according to the first aspect discussed above,
 wherein the step of producing the second heat-shielding film is performed under an anodizing treatment condition that pores which open to both surfaces of the second heat-shielding film do not communicate with one another in a thickness direction of the second heat-shielding film.

A fourth aspect of an embodiment of the present application is the method for forming a heat-shielding film according to the first aspect discussed above,
wherein the first heat-shielding film and the second heat-shielding film have pores that open to surfaces,
the step of bonding the second heat-shielding film is a step of disposing the second heat-shielding film on the surface of the first heat-shielding film, and pouring the adhesive from between the first heat-shielding film and the second heat-shielding film so that the adhesive enters the pores of both of the first heat-shielding film and the second heat-shielding film from an interface between the first heat-shielding film and the second heat-shielding film, and curing the adhesive.

A fifth aspect of an embodiment of the present application is a heat-shielding film structure, comprising:
a first heat-shielding film that is a heat-shielding film formed on a surface of a component that is formed from an Al alloy with an Al purity of less than 99.0% as a base material, and configures a combustion chamber of an internal combustion engine, has a lower heat conductivity and a lower heat capacity per unit volume than the base material, and has a porous structure; and
a second heat-shielding film that is a heat-shielding film formed on a surface of the first heat-shielding film, is obtained by anodizing treatment of Al foil with an Al purity equal to or larger than 99.0%, and has a porous alumina, which has a lower heat conductivity and a lower heat capacity per unit volume than the base material, formed on a surface.

A sixth aspect of an embodiment of the present application is the heat-shielding film structure according to the fifth aspect discussed above,
wherein between the first heat-shielding film and the second heat-shielding film, an intermediate layer composed of an adhesive is formed, and
voids are formed inside the intermediate layer.

A seventh aspect of an embodiment of the present application is the heat-shielding film structure according to the fifth aspect discussed above,
wherein the second heat-shielding film has pores that open to both surfaces, and the pores do not communicate with one another in a thickness direction of the second heat-shielding film.

An eighth aspect of an embodiment of the present application is the heat-shielding film structure according to any one of the fifth aspect discussed above,
wherein the first heat-shielding film and the second heat-shielding film have pores that open to surfaces, and
between the first heat-shielding film and the second heat-shielding film, an intermediate layer, which is composed of an adhesive that is cured in such a manner as to enter the pores of both of the first heat-shielding film and the second heat-shielding film from an interface between the first heat-shielding film and the second heat-shielding film, is formed.

According to the first aspect discussed above, the heat-shielding film can be formed by producing the second heat-shielding film by anodizing treatment of both the surfaces of the Al foil with the Al purity equal to or larger than 99.0%, and bonding the second heat-shielding film onto the surface of the first heat-shielding film. The second heat-shielding film which is produced by anodizing treatment of the Al foil with the Al purity equal to or larger than 99.0% has low surface roughness Ra of an average of approximately 1.0 μm even in an unpolished state, since the Al foil hardly contains additives. Accordingly, polishing or like of the second heat-shielding film with an objective of smoothing after bonding the second heat-shielding film can be omitted. That is, in the formation process of the heat-shielding film, the film performance and film strength can be favorably restrained from being impaired.

According to the second aspect discussed above, in the state where the surface roughness of the first heat-shielding film which faces the second-heat shielding film is higher than the surface roughness of the second heat-shielding film, the second heat-shielding film is disposed on the surface of the first heat-shielding film, and the adhesive is poured to between these films and can be cured. Since the surface roughness of the first heat-shielding film which faces the second heat-shielding film is higher than the surface roughness of the second heat-shielding film, voids are intentionally formed between these films when the adhesive is poured, and can be caused to remain even after curing. Accordingly, the heat capacity of the adhesive part after being cured can be reduced.

When both the surfaces of the Al foil are subjected to anodizing treatment, the pores which open to both the surfaces of the second heat-shielding film are formed. Here, the second heat-shielding film forms a top surface of the first heat-shielding film, and an outermost surface at a combustion chamber side. Therefore, when the pores of the second heat-shielding film communicate with one another in the thickness direction, the working gas in the combustion chamber can reach the first heat-shielding film side via the pores of the second heat-shielding film, and is likely to impair the film performance of the first heat-shielding film. In this regard, according to the third aspect discussed above, the Al part in an unoxidized state can be left inside the second heat-shielding film, and therefore, occurrence of a trouble like this can be avoided.

According to the fourth aspect discussed above, the adhesive can be poured from between the first heat-shielding film and the second heat shielding film in such a manner as to enter the pores of both of the films from the interface between the first heat-shielding film and the second heat-shielding film, and can be cured. Accordingly, the first heat-shielding film and the second heat-shielding flu can be firmly bonded by an anchor effect by the adhesive.

According to the fifth aspect discussed above, the heat-shielding film structure with a smoothed surface can be provided by the second heat-shielding film which has low surface roughness Ra of an average of approximately 1.0 μm even in an unpolished state.

According to the sixth aspect discussed above, by the voids which are formed inside the intermediate layer, the heat capacity of the intermediate layer can be reduced.

Since the second heat-shielding film forms the top surface of the first heat-shielding film, and the outermost surface at the combustion chamber side, when the pores of the second heat-shielding film communicate with one another in the thickness direction, the working gas in the combustion chamber can reach the first heat-shielding film side via the pores of the second heat-shielding film, and the film performance of the first heat-shielding film is likely to be impaired. In this regard, according to the seventh aspect discussed above, the pores which open to both the surfaces of the second heat-shielding film do not communicate in the thickness direction, and therefore, occurrence of a trouble like this can be avoided.

According to the eighth aspect discussed above, the first heat-shielding film and the second heat-shielding film can be firmly bonded by the anchor effect by the intermediate layer which is composed of the adhesive which is cured in such a manner as to enter the pores of both the first heat-shielding film and the second heat-shielding film from the interface between the first heat-shielding film and the second heat-shielding film.

DETAILED DESCRIPTION

Figure 1:
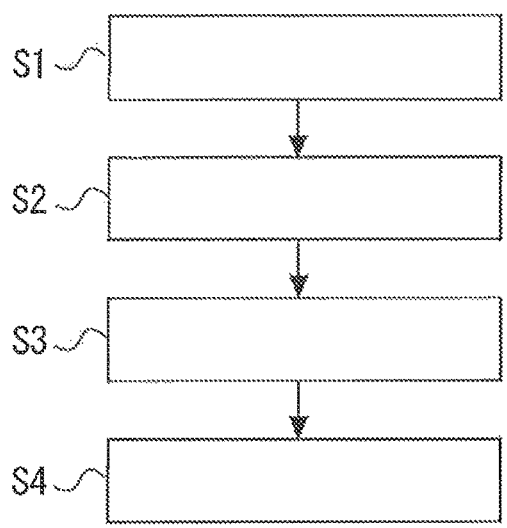
FIG. 1 is a flowchart explaining the embodiment of the method for forming the heat-shielding film.

Hereinafter, an embodiment of a method for forming a heat-shielding film and a heat-shielding structure of the present invention will be described with reference to FIGS. 1 to 7. Note that in the respective drawings, the same or corresponding portions are assigned with the same reference signs and explanation thereof will be simplified or omitted.
[Method for Forming Heat-Shielding Film]
First, an embodiment of the method for forming a heat-shielding film of the present invention will be described. FIG. 1 is a flowchart explaining the embodiment of the method for forming the heat-shielding film. In the present embodiment, a first heat-shielding film is firstly formed on surfaces (specifically, a bottom surface of a cylinder head and a top surface of a piston) of components (hereinafter, referred to as "a combustion chamber configuring component") that configure a combustion chamber of an internal combustion engine (step S1). The combustion chamber configuring component is formed from an Al alloy (Al purity of less than 99.0%) as a base material, and in the present step, anodizing treatment of the surface is performed. Specifically, in the present step, after the combustion chamber configuring component is placed in a treatment device, an electrolytic solution aqueous solution of a phosphoric acid, an oxalic acid, a sulfuric acid, a chromic acid or the like) is supplied to the surface of the combustion chamber configuring component, and electrolysis is performed while an electric current density and an energizing time are regulated. By the electrolysis, the first heat-shielding film of a film thickness of 50 µm or more (50 µm to 200 µm) is formed.

Figure 2:
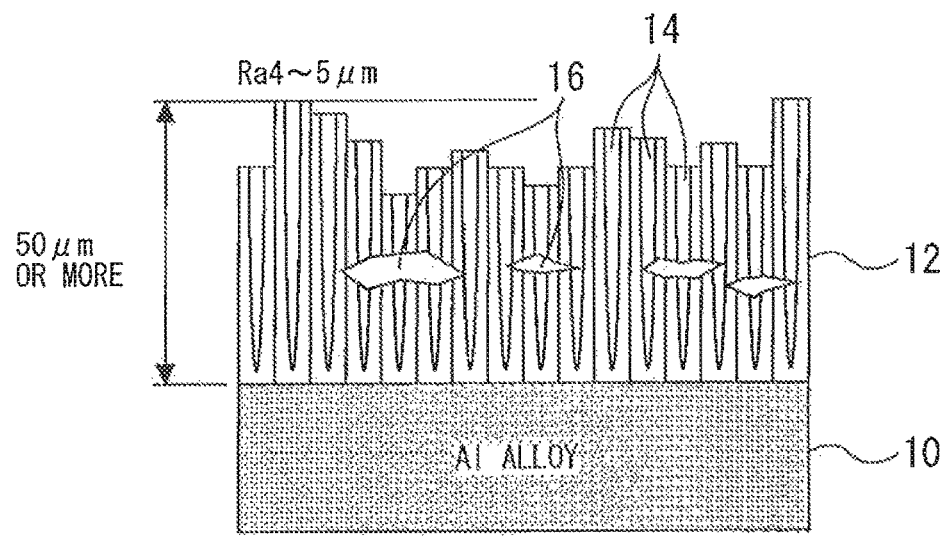
FIG. 2 is a schematic sectional view of the combustion configuring component immediately after step S1.

FIG. 2 is a schematic sectional view of the combustion configuring component immediately after step S1. As shown in FIG. 2, a first heat-shielding film 12 having an infinite number of pores 14 that open to the surface is formed on the combustion chamber configuring component 10. The first heat-shielding film 12 is a so-called anodized aluminum film, and functions as a heat-shielding film having a lower heat conductivity and a lower heat capacity per unit volume than the Al alloy which is the base material, by a porous structure having the pores 14 which are formed in a process of the anodizing treatment. Further, inside the first heat-shielding film 12, small holes 16 are formed besides the pores 14. The small holes 16 are due to additives (mainly Si) for enhancing mechanical properties, and by the small holes 16 being formed, the heat capacity of the first heat-shielding film 12 is reduced. However, as a result that the small holes 16 are formed, microscopic asperities are generated on the surface of the first heat-shielding film 12, and surface roughness Ra of the first heat-shielding film 12 at this stage is as high as an average of 4.0 to 5.0 µm.

Figure 3:
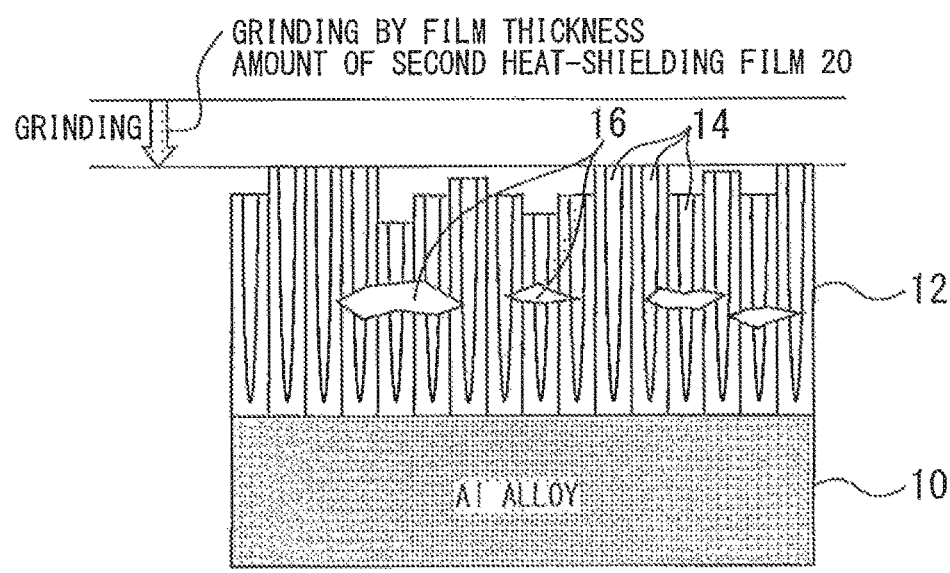
FIG. 3 is a schematic sectional view of the combustion chamber configuring component 10 directly after step S2.

Subsequently to step S1, a surface of the first heat-shielding film 12 is subjected to grinding (step S2). Specifically, in the present step, of the surface of the first heat-shielding film 12, a region on which a second heat-shielding film 20 (described later) is to be pasted (hereinafter, referred to as "a pasting region") is shaved off in a thickness direction by an amount of a film thickness of the second heat-shielding film 20. FIG. 3 is a schematic sectional view of the combustion chamber configuring component 10 directly after step S2, and shows a surface portion of the first heat-shielding film 12 corresponding to the pasting region. As shown in FIG. 3, in the pasting region, microscopic asperities are still generated, and the surface roughness Ra thereof is an average of 3.0 to 4.5 µm. The reason why the surface roughness Ra of the pasting region is not made extremely low at the stage of the present step is for intentionally forming voids in between the first heat-shielding film 12 and the second heat-shielding film 20 in step S3 that will be described later. Note that the surface of the first heat-shielding film 12 with exception of the pasting region is not subjected to grinding, and accordingly the surface roughness Ra of the other region remains to be 4.0 to 5.0 µm on average.

Figure 4:
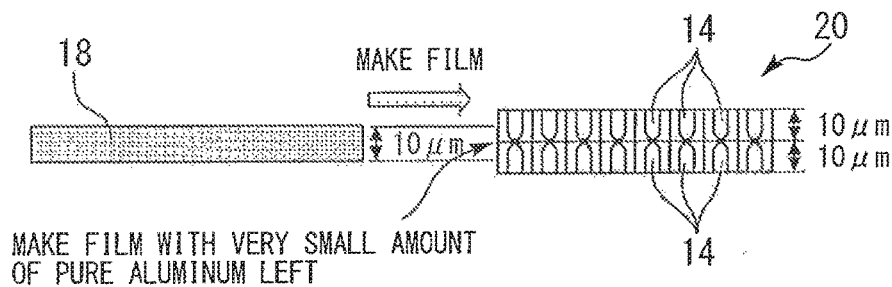
FIG. 4 is a view for explaining step S3.

Subsequently to step S2, the second heat-shielding film is produced (step S3), in this step, anodizing treatment of Al foil (hereinafter, referred to as "pure Al foil") with an Al purity equal to or larger than 99.0% (preferably equal to or larger than 99.5%) is performed similarly to step S1. FIG. 4 is a view for explaining step S3. As shown in FIG. 4, in the present step, both surfaces of pure Al foil 18 (thickness of approximately 10 µm) are subjected to anodizing treatment simultaneously, whereby the second heat-shielding film 20 (film thickness of approximately 20 µm) where an infinite number of pores 14 are opened is produced (formed). Since both the surfaces of the pure Al foil 18 are simultaneously subjected to anodized treatment, the pores 14 are opened to both the surfaces of the second heat-shielding film 20.

Here, the reason why the second heat-shielding film 20 becomes thicker than the pure Al foil 18 is that at the time of the anodizing treatment, Al on both the surfaces of the pure Al foil 18 is gradually oxidized to an inner direction and alumina ($Al_2O_3$) grows in a thickness direction (a direction perpendicular to the surface of the pure Al foil 18). The growth of the $Al_2O_3$ is similar in the combustion chamber configuring component 10. That is, the combustion chamber configuring component 10 after anodizing treatment becomes thicker than it is before the anodizing treatment. Further, for convenience of explanation, the pure Al foil 18 is plate-shaped in FIG. 4, but actually, the pure Al foil 18 is press-formed in accordance with a wall surface shape of the combustion chamber, and thereafter, anodizing treatment is performed (see FIG. 5).

The second heat-shielding film 20 functions as a heat-shielding film having a lower heat conductivity and a lower heat capacity per unit volume than the Al alloy which is the base material, similarly to the first heat-shielding film 12. However, unlike the first heat-shielding film 12 in which the small holes 16 are formed, the second heat-shielding film 20 has a dense structure. Consequently, the second heat-shielding film 20 has a high hardness, and the surface roughness Rn of the second heat-shielding film 20 is as low as an average of approximately 1.0 µm. The reason thereof is that since the pure Al foil 18 hardly contains impurities and the pure Al foil 18 is also thin, an oxidizing rate of Al (in other words, a growth rate of $Al_2O_3$) is substantially uniform on the same surface.

Here, in order to exhibit the film function of the second heat-shielding film 20, it is desirable that most of the pure Al foil 18 is oxidized, and an Al part hardly remains inside. However, since when the pores 14 communicate with one another in the thickness direction of the second heat-shielding film 20, a working gas can pass in the thickness direction of the second heat-shielding film 20, and the film function is reduced, it is not desirable that a whole of the pure Al foil 18 is oxidized. Based on the viewpoint like this, in the present step, electrolysis is performed while the electric current density and the energizing time are regulated so that a very small Al part in an unoxidized state remains inside the second heat-shielding film 20 (specifically, so that a thickness of the Al part in the unoxidized state becomes 5% to 20% of the thickness before treatment).

Figure 5:
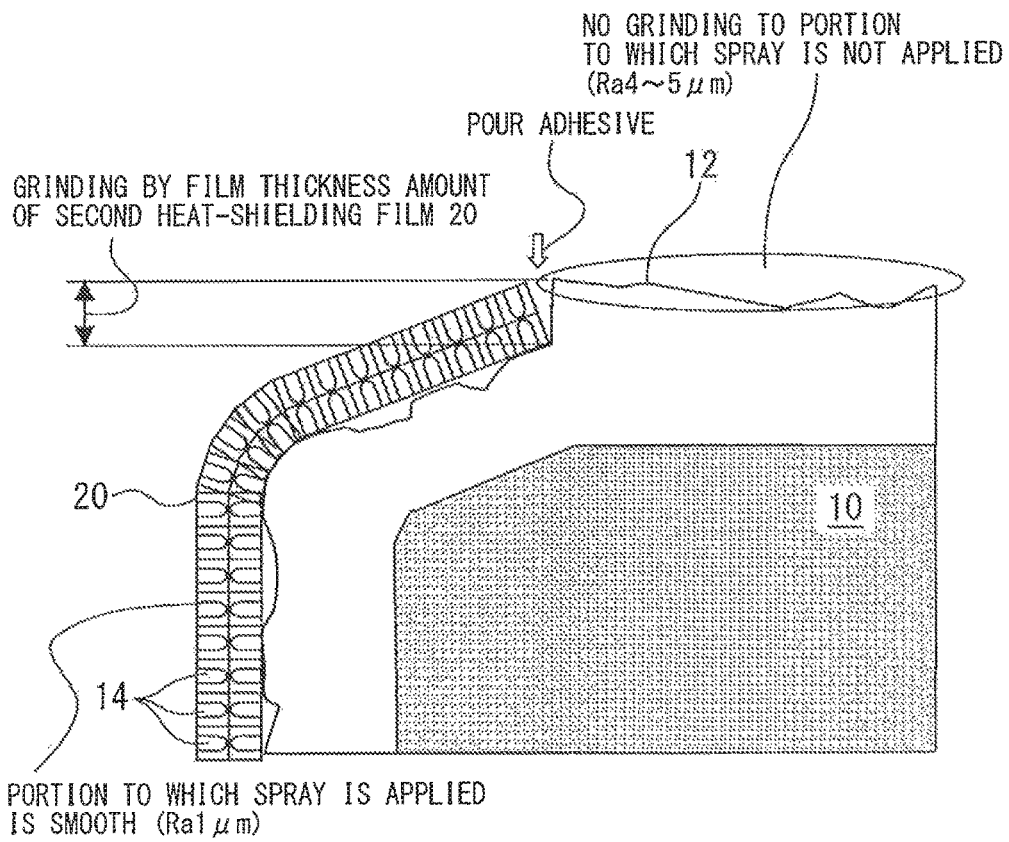
FIG. 5 is a view for explaining step S4.

Subsequently to step S3, the second heat-shielding film 20 is bonded to the surface of the first heat-shielding film 12 (step S4). FIG. 5 is a view for explaining step S4. Here, the combustion chamber configuring component 10 is a piston, and a region corresponding to a side surface of a cavity of the piston, and a taper surface of an outer periphery of the cavity is assumed to be the pasting region described in step S2. As shown in FIG. 5, in the present step, the second heat-shielding film 20 is disposed on the pasting region, and a heat resistant adhesive (to be specific, a silicon polymer solution containing a silicon in a main chain, more specifically, a polymer solution containing a polysilazane or polysiloxane, and an ether solvent) is poured to between the first heat-shielding film 12 and the second heat-shielding film 20.

Here, the heat resistant adhesive with low viscosity is used. Consequently, the heat resistant adhesive which is poured to between the first heat-shielding film 12 and the second heat-shielding film 20 uniformly diffuses between these heat-shielding films to form an interface, and partially enters the pores 14 in these heat-shielding films. Further, between these heat-shielding films, voids where the heat resistant adhesive does not exist are formed. The reason thereof is that since the surface roughness Ra of the pasting region is as high as an average of 3.0 to 4.5 µm, a very small gap is generated between the first heat-shielding film 12 and the second heat-shielding film 20, and therefore, the heat resistant adhesive which is poured into the gap enters the pores 14, whereby the adhesive which should fill the gap decreases.

After the heat resistant adhesive is poured to between the first heat-shielding film 12 and the second heat-shielding film 20, the heat resistant adhesive is heated and cured. Heating conditions (a temperature, a time period and the like) are not specially limited as long as the conditions are such that the heat resistant adhesive can be cured, and the first heat-shielding film 12, the second heat-shielding film 20 and the combustion chamber configuring component 10 are not softened.

By the forgoing, the second heat-shielding film 20 is produced by anodizing treatment of the pure Al foil 18, and is bonded onto the surface of the first heat-shielding film 12 which is formed by the anodizing treatment of the combustion chamber configuring component 10, and the heat-shielding film can be formed. In particular, in the present embodiment, the surface roughness Ra of the second heat-shielding film 20 which is produced from the pure Al foil 18 in step S3 is as low as an average of approximately 1.0 µm although the second heat-shielding film 20 is in an unpolished state. Consequently, polishing or the like of the second heat-shielding film 20 with the objective of smoothing after bonding the second heat-shielding film 20 can be omitted. Accordingly, the heat-shielding film with the smoothed surface can be formed while the film performance and the film strength are favorably restrained from being impaired in the formation process of the heat-shielding film.

Incidentally, in the above described embodiment, step S3 is performed between step S2 and step S4, but the treatment timing in step S3 may be between the treatments in step S1 and step S2, or may be before the treatment in step S1. That is, the first heat-shielding film 12 is formed on the surface of the combustion chamber configuring component 10, and before the surface of the first heat-shielding film 12 is subjected to grinding, the second heat-shielding film 20 may be produced. Alternatively, after the second heat-shielding film 20 is produced, the first heat-shielding film 12 is formed on the surface of the combustion chamber configuring component 10, and the surface of the first heat-shielding film 12 may be subjected to grinding.

Further, in the above described embodiment, the first heat-shielding film 12 is an anodized aluminum film, and is formed by subjecting the surface of the combustion chamber configuring component 10 to anodizing treatment in step S1. However, the first heat-shielding film 12 may be a ceramics-sprayed film of a zirconia ($ZrO_2$), a silica ($SiO_2$), a silicon nitride ($Si_3N_4$), a yttria ($Y_2O_3$), a titanium oxide ($TiO_2$) and the like. A ceramics-sprayed film is formed by spraying a material to the surface of the combustion chamber configuring component 10 in step S1, and functions as a heat-shielding film having a lower heat conductivity than the Al alloy which is the base material of the combustion chamber configuring component 10, similarly to the anodized aluminum film. Further, these sprayed-films have internal air bubbles that are formed in a process of spraying, and therefore, function as heat-shielding films having lower heat capacities per unit volume than Al alloy, similarly to the anodized aluminum film, whereas these sprayed-films tend to have high surface roughness.

[Heat-Shielding Film Structure]

Figure 6:
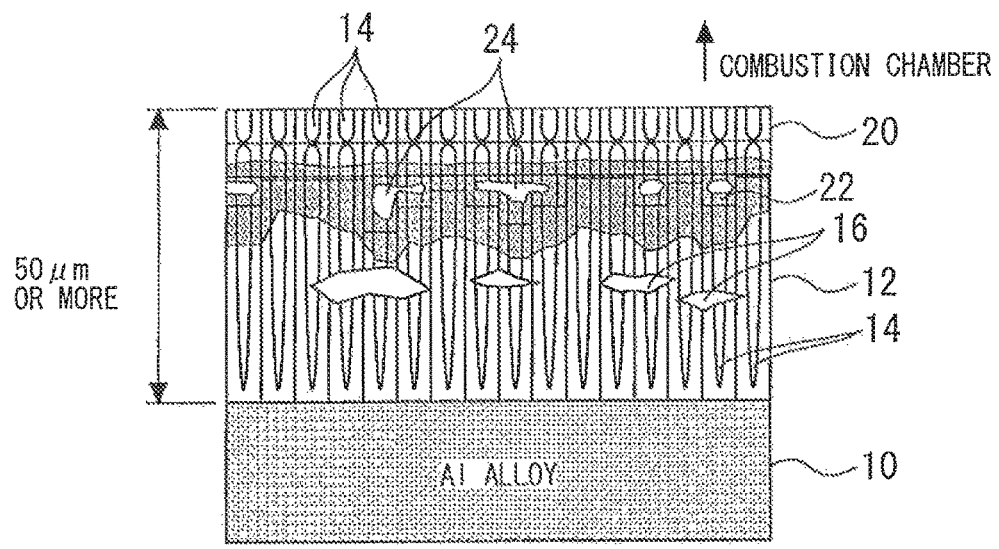
FIG. 6 a view for explaining the heat-shielding film structure of the present invention.
Figure 7:
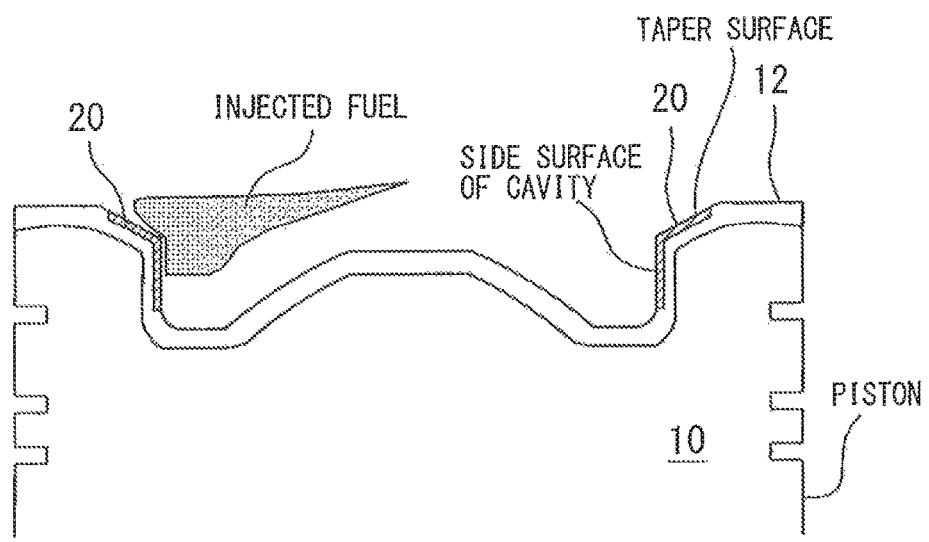
FIG. 7 is a schematic sectional view of the combustion chamber of a compression ignition type internal combustion engine.

Next, an embodiment of a heat-shielding structure of the present invention will be described, FIG. 6 is a view for explaining the heat-shielding film structure of the present invention, and shows a schematic sectional view of the pasting region described in step S2. As shown in FIG. 6, on the surface of the combustion chamber configuring component 10, the first heat-shielding film 12 having the pores 14 and the small holes 16, and the second heat-shielding film 20 having the pores 14 are formed. A film thickness in a stacking direction of the entire heat-shielding film with the first heat-shielding film 12 and the second heat-shielding film 20 combined is 50 µm or more (50 µm to 200 µm).

As already described, the first heat-shielding film 12 and the second heat-shielding film 20 function as heat-shielding films having lower heat conductivities and lower heat capacities per unit volume than the Al alloy which is the base material. Consequently, followability of the wall surface temperature to the working gas temperature in the combustion chamber is enhanced, and various effects can be obtained. That is, in an intake stroke and a compression stroke of the internal combustion engine, occurrence of knocking and abnormal combustion by heating of intake air is restrained, and in a combustion stroke, fuel efficiency can be enhanced by reducing a cooling loss. For the characteristics of the heat-shielding film like this, and the effects by the heat-shielding film, reference can be made to JP2013-060620A, JP2013-024142A and JP2015-031226A, for example.

Further, as already described, the surface roughness Ra of the second heat-shielding film 20 is as low as approximately 1.0 μm. Consequently, occurrence of a trouble accompanying formation of the heat-shielding film, such as reduction in the heat-shielding performance due to increase of the heat transfer area, and reduction in flowability of injected fuel and generated flames can be also restrained favorably. In particular, in a compression ignition type internal combustion engine, fuel that is injected from an injector diffuses into a combustion chamber after colliding with a side surface of a cavity, and a taper surface of an outer periphery of the cavity (see FIG. 7). Consequently, by providing the second heat-shielding film 20 having the low surface roughness Ra on at least the side surface and the taper surface, diffusion of the injected fuel into the combustion chamber can be promoted.

Further, as shown in FIG. 6, an intermediate layer 22 is formed between the first heat-shielding film 12 and the second heat shielding film 20. The intermediate layer 22 is formed from the aforementioned heat resistant adhesive, and is firmly connected to these films (anchor effect) by being cured in such a manner as to enter the pores 14 in the first heat-shielding film 12, and the pores 14 in an undersurface (a surface facing the first heat-shielding film 12) of the second heat-shielding film 20. Since the heat resistant adhesive enters the pores 14, there is no clear boundary between the first heat-shielding film 12 and the intermediate layer 22, or between the second heat-shielding film 20 and the intermediate layer 22.

Further, as shown in FIG. 6, voids 24 are formed inside the intermediate layer 22. The voids 24 are derived from the voids that are intentionally formed in step S3 described above, and since the voids 24 like them are formed, heat capacity is also reduced in the intermediate layer 22, and the aforementioned followability of the wall surface temperature can be enhanced.

However, the heat resistant adhesive which configures the intermediate layer 22 has lower strength as compared with the anodized aluminum which composes the first heat-shielding film 12 and the second heat-shielding film 20, and is likely to be broken due to a pressure variation in the combustion chamber, collision of high-pressure injected fuel and the like. In this regard, in the present embodiment, the Al part in an unoxidized state remains inside the second heat-shielding film 20, and the pores 14 do not communicate with one another in the thickness direction of the second heat-shielding film 20. Therefore, the pressure variation in the combustion chamber is absorbed by the Al part, or entry of the high-pressure injected fuel is cut off by the Al part, and thereby the intermediate layer 22 can be protected. Further, since the Al part remains, the working gas is not allowed to pass in the thickness direction of the second heat-shielding film 20, and reduction in the followability of the wall surface temperature described above can be favorably restrained.

The invention claimed is:

1. A method for forming a heat-shielding film, comprising:
    a step of forming, on a surface of a component that is formed from an aluminum alloy with an aluminum purity of less than 99.0% as a base material and configures a combustion chamber of an internal combustion engine, a first heat-shielding film that has a lower heat conductivity and a lower heat capacity per unit volume than the base material, and has a porous structure;
    a step of producing a second heat-shielding film in which a porous alumina having a lower heat conductivity and a lower heat capacity per unit volume than the base material is formed on a surface, by anodizing treatment of aluminum foil with an aluminum purity equal to or higher than 99.0%; and
    a step of bonding the second heat-shielding film onto a surface of the first heat shielding film,
    wherein the step of bonding the second heat-shielding film is a step of disposing the second heat-shielding film on the surface of the first heat-shielding film in a state where surface roughness of the first heat-shielding film is higher than surface roughness of the second heat-shielding film which is opposed to the first heat-shielding film, and pouring an adhesive to between the first heat-shielding film and the second heat-shielding film and curing the adhesive.

2. The method according to claim 1, wherein the step of producing the second heat-shielding film is performed under an anodizing treatment condition that pores which open to both surfaces of the second heat-shielding film do not communicate with one another in a thickness direction of the second heat-shielding film.

3. A method for forming a heat-shielding film, comprising:
    a step of forming, on a surface of a component that is formed from an aluminum alloy with an aluminum purity of less than 99.0% as a base material and configures a combustion chamber of an internal combustion engine, a first heat-shielding film that has a lower heat conductivity and a lower heat capacity per unit volume than the base material, and has a porous structure;
    a step of producing a second heat-shielding film in which a porous alumina having a lower heat conductivity and a lower heat capacity per unit volume than the base material is formed on a surface, by anodizing treatment of aluminum foil with an aluminum purity equal to or higher than 99.0%; and
    a step of bonding the second heat-shielding film onto a surface of the first heat-shielding film,
    wherein the first heat-shielding film and the second heat-shielding film have pores that open to surfaces,
    the step of bonding the second heat-shielding film is a step of disposing the second heat-shielding film on the surface of the first heat-shielding film, and pouring an adhesive from between the first heat-shielding film and the second heat-shielding film so that the adhesive enters the pores of both of the first heat-shielding film and the second heat-shielding film from an interface between the first heat-shielding film and the second heat-shielding film, and curing the adhesive.

4. A method for forming a heat-shielding film, comprising:
    a step of forming, on a surface of a component that is formed from an aluminum alloy with an aluminum purity of less than 99.0% as a base material and configures a combustion chamber of an internal combustion engine, a first heat-shielding film that has a lower heat conductivity and a lower heat capacity per unit volume than the base material, and has a porous structure;

a step of producing a second heat-shielding film in which a porous alumina having a lower heat conductivity and a lower heat capacity per unit volume than the base material is formed on a surface, by anodizing treatment of aluminum foil with an aluminum purity equal to or higher than 99.0%;

a step of grinding a predetermined region on a surface of the first heat-shielding film in its thickness direction by the film thickness of the second heat shielding film; and a step of bonding the second heat-shielding film onto the predetermined region after grinding the first heat-shielding film.

5. The method for forming a heat-shielding film according to claim 4, wherein the step of bonding the second heat-shielding film is a step of disposing the second heat-shielding film on the predetermined region in a state where surface roughness of the predetermined region is higher than surface roughness of the second heat-shielding film which is opposed to the predetermined region, and pouring an adhesive to between the first heat-shielding film and the second heat-shielding film and curing the adhesive.

6. The method for forming a heat-shielding film according to claim 4, wherein the step of producing the second heat-shielding film is performed under an anodizing treatment condition that pores which open to both surfaces of the second heat-shielding film do not communicate with one another in a thickness direction of the second heat-shielding film.

7. The method for forming a heat-shielding film according to claim 4, wherein the first heat-shielding film and the second heat-shielding film have pores that open to surfaces, the step of bonding the second heat-shielding film is a step of disposing the second heat-shielding film on the predetermined region, and pouring an adhesive from between the first heat-shielding film and the second heat-shielding film so that the adhesive enters the pores of both of the first heat-shielding film and the second heat-shielding film from an interface between the first heat-shielding and the second heat-shielding film, and curing the adhesive.

* * * * *